US010897507B2

(12) United States Patent
Faccin et al.

(10) Patent No.: US 10,897,507 B2
(45) Date of Patent: Jan. 19, 2021

(54) MECHANISM TO ENABLE CONNECTIVITY SESSIONS AND IP SESSION ESTABLISHMENT

(71) Applicant: QUALCOMM Incorporated, San Diego, CA (US)

(72) Inventors: Stefano Faccin, San Ysidro, CA (US); Gavin Bernard Horn, La Jolla, CA (US); Soo Bum Lee, San Diego, CA (US); John Wallace Nasielski, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 476 days.

(21) Appl. No.: 15/380,416

(22) Filed: Dec. 15, 2016

(65) Prior Publication Data

US 2017/0289265 A1 Oct. 5, 2017

Related U.S. Application Data

(60) Provisional application No. 62/317,008, filed on Apr. 1, 2016.

(51) Int. Cl.
*H04L 29/08* (2006.01)
*H04W 76/15* (2018.01)
(Continued)

(52) U.S. Cl.
CPC ............ *H04L 67/141* (2013.01); *H04L 43/08* (2013.01); *H04L 65/4007* (2013.01);
(Continued)

(58) Field of Classification Search
CPC ....... H04L 67/14; H04L 67/141; H04L 69/14; H04L 48/17; H04W 76/10; H04W 76/11;
(Continued)

(56) References Cited

U.S. PATENT DOCUMENTS 8,358,602 B2 1/2013 Puthiyandyil et al.
8,566,455 B1 * 10/2013 Zhao ...................... H04W 76/10
709/227
(Continued)

FOREIGN PATENT DOCUMENTS

EP 3310080 A1 * 4/2018 ............. H04W 8/26
WO WO-2015150875 A1 10/2015

OTHER PUBLICATIONS

WO 2017/063151 A1, WIPO, Xu et al., Apr. 2017, H04W88/16 (Year: 2017).*

(Continued)

*Primary Examiner* — Michael Won
*Assistant Examiner* — William C McBeth
(74) *Attorney, Agent, or Firm* — Patterson + Sheridan, L.L.P.

(57) ABSTRACT

Certain aspects of the present disclosure relate to methods and apparatus enabling connectivity session and internet protocol (IP) establishment. An exemplary method generally generating a request to establish at least one data network (DN) session for providing connectivity between the UE and a DN, wherein the at least one DN session supports a plurality of data sessions for enabling communication between one or more local endpoints in the UE and one or more endpoints in the DN, wherein each data session of the plurality of data sessions supports one or more connectivity requirements specified by the UE, wherein a first data session of the plurality of data sessions is associated with a first gateway, and wherein a second data session of the plurality of data sessions is associated with a second gateway, and transmitting the request to establish the at least one DN session.

27 Claims, 13 Drawing Sheets

(51) Int. Cl.
  *H04L 29/06* (2006.01)
  *H04W 88/16* (2009.01)
  *H04W 48/00* (2009.01)
  *H04L 12/26* (2006.01)
  *H04W 76/12* (2018.01)
  *H04L 12/66* (2006.01)

(52) U.S. Cl.
  CPC ............. *H04L 69/14* (2013.01); *H04W 48/17* (2013.01); *H04W 76/15* (2018.02); *H04W 88/16* (2013.01); *H04L 12/66* (2013.01); *H04W 76/12* (2018.02)

(58) Field of Classification Search
  CPC ..... H04W 76/15; H04W 88/16; H04W 76/12; H04W 76/00; H04W 88/005; H04W 88/18; H04W 60/00; H04W 60/05
  See application file for complete search history.

(56) References Cited

U.S. PATENT DOCUMENTS

| | | | | |
|---|---|---|---|---|
| 9,055,557 B1* | 6/2015 | Bayar | | H04W 76/10 |
| 9,220,118 B1* | 12/2015 | Ramamurthy | | H04W 76/10 |
| 2010/0274878 A1* | 10/2010 | Yin | | H04W 76/11 |
| | | | | 709/222 |
| 2011/0131338 A1* | 6/2011 | Hu | | H04W 76/11 |
| | | | | 709/229 |
| 2011/0199987 A1* | 8/2011 | Rommer | | H04W 76/11 |
| | | | | 370/329 |
| 2012/0102174 A1* | 4/2012 | Zhou | | H04W 76/12 |
| | | | | 709/223 |
| 2012/0176997 A1* | 7/2012 | Rydnell | | H04W 76/12 |
| | | | | 370/329 |
| 2012/0263076 A1* | 10/2012 | Zhao | | H04W 76/15 |
| | | | | 370/254 |
| 2012/0307799 A1 | 12/2012 | Taleb et al. | | |
| 2013/0308604 A1* | 11/2013 | Jiang | | H04W 48/20 |
| | | | | 370/331 |
| 2013/0343304 A1* | 12/2013 | Kaippallimalil | | H04W 28/18 |
| | | | | 370/329 |
| 2014/0078986 A1 | 3/2014 | Kaippallimalil et al. | | |
| 2014/0126486 A1* | 5/2014 | Brequigny | | H04W 76/10 |
| | | | | 370/329 |
| 2014/0169332 A1 | 6/2014 | Taleb et al. | | |
| 2015/0029956 A1* | 1/2015 | Moses | | H04W 76/10 |
| | | | | 370/329 |
| 2015/0271709 A1* | 9/2015 | Rune | | H04W 76/15 |
| | | | | 370/329 |
| 2015/0341830 A1* | 11/2015 | Jeong | | H04W 72/0406 |
| | | | | 370/329 |
| 2015/0365878 A1 | 12/2015 | Cho et al. | | |
| 2016/0255540 A1* | 9/2016 | Kweon | | H04W 76/15 |
| | | | | 370/237 |
| 2016/0301762 A1* | 10/2016 | Strijkers | | H04L 67/16 |
| 2016/0360458 A1* | 12/2016 | Lubenski | | H04W 76/12 |
| 2016/0360508 A1* | 12/2016 | Kawakishi | | H04W 76/25 |
| 2017/0078959 A1* | 3/2017 | Enomoto | | H04W 76/10 |
| 2017/0079075 A1* | 3/2017 | Han | | H04W 76/10 |
| 2017/0111279 A1* | 4/2017 | Renzullo | | H04L 12/2856 |
| 2017/0290082 A1* | 10/2017 | Salkintzis | | H04W 76/12 |
| 2017/0325055 A1* | 11/2017 | Enomoto | | H04W 76/10 |
| 2018/0049103 A1* | 2/2018 | Takeda | | H04W 76/10 |
| 2019/0281492 A1* | 9/2019 | Hans | | H04L 47/2475 |

OTHER PUBLICATIONS

WO 2017/209668 A1, WIPO, Rune et al., Dec. 2017, H04W8/24 (Year: 2017).*

Taleb, Tarik, Yassine Hadjadj-Aoul, and Stefan Schmid. "Geographical location and load based gateway selection for optimal traffic offload in mobile networks." International Conference on Research in Networking. Springer, Berlin, Heidelberg, 2011. (Year: 2011).*

<span style="font-family: calibri;">3GPP 23.401, CR 2967, Change Request, "Introduction of SCEF Connectivity Service for Control Plane CIoT EPS Optimization", 3GPP TSG SA WG2 Meeting #113, S2-160276, Cisco Systems, St. Kitts, KN , 25th-29th Jan. 2016 Version 13.5.0. (Release 13) pp. 1-44.

3GPP: "3rd Generation Partnership Project; Technical Specification Group Services and System Aspects; General Packet Radio Service (GPRS) Enhancements for Evolved Universal Terrestrial Radio Access Network (E-UTRAN) access (Release 13)," Mar. 1, 2016 (Mar. 1, 2016), 366 pages, XP055376194, European Telecommunications Standards Institute (ETSI), 650, route des Lucioles, F-06921 Sophia-Antipolis ; France Retrieved from the Internet: URL:http://www.3gpp.org/ftp/%5CSpecs%5Carchive%5C23_series%5C23.401%5C [retrieved on May 26, 2017].

International Search Report and Written Opinion—PCT/US2017/024612—ISA/EPO—dated Jun. 7, 2017.

* cited by examiner

MECHANISM TO ENABLE CONNECTIVITY SESSIONS AND IP SESSION ESTABLISHMENT

CLAIM OF PRIORITY UNDER 35 U.S.C. § 119

This application claims benefit of U.S. Provisional Patent Application Ser. No. 62/317,008, filed Apr. 1, 2016, which is herein incorporated by reference in its entirety.

FIELD

The present disclosure relates generally to communication systems, and more particularly, to methods and apparatus for enabling connectivity sessions and internet protocol (IP) establishment.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for enabling connectivity sessions and internet protocol (IP) establishment.

Certain aspects of the present disclosure provide a method for wireless communications by a user equipment (UE). The method generally includes generating a request to establish at least one data network (DN) session for providing connectivity between the UE and a DN, wherein the at least one DN session supports a plurality of data sessions for enabling communication between one or more local endpoints in the UE and one or more endpoints in the DN, wherein each data session of the plurality of data sessions supports one or more connectivity requirements specified by the UE, wherein a first data session of the plurality of data sessions is associated with a first gateway, and wherein a second data session of the plurality of data sessions is associated with a second gateway, and transmitting the request to establish the at least one DN session.

Certain aspects of the present disclosure provide an apparatus for wireless communications by a user equipment (UE). The apparatus generally includes at least one processor configured to generate a request to establish at least one data network (DN) session for providing connectivity between the UE and a DN, wherein the at least one DN session supports a plurality of data sessions for enabling communication between one or more local endpoints in the UE and one or more endpoints in the DN, wherein each data session of the plurality of data sessions supports one or more connectivity requirements specified by the UE, wherein a first data session of the plurality of data sessions is associated with a first gateway, and wherein a second data session of the plurality of data sessions is associated with a second gateway, and a transmitter configured to transmit the request to establish the at least one DN session. The apparatus also generally includes memory coupled with the at least one processor.

Certain aspects of the present disclosure provide an apparatus for wireless communications by a user equipment (UE). The apparatus generally includes means for generating a request to establish at least one data network (DN) session for providing connectivity between the UE and a DN, wherein the at least one DN session supports a plurality of data sessions for enabling communication between one or more local endpoints in the UE and one or more endpoints in the DN, wherein each data session of the plurality of data sessions supports one or more connectivity requirements specified by the UE, wherein a first data session of the plurality of data sessions is associated with a first gateway, and wherein a second data session of the plurality of data sessions is associated with a second gateway, and means for transmitting the request to establish the at least one DN session.

Certain aspects of the present disclosure provide a non-transitory computer-readable medium for wireless communication by a user equipment (UE). The non-transitory computer-readable medium generally includes instructions for generating a request to establish at least one data network (DN) session for providing connectivity between the UE and a DN, wherein the at least one DN session supports a plurality of data sessions for enabling communication between one or more local endpoints in the UE and one or more endpoints in the DN, wherein each data session of the plurality of data sessions supports one or more connectivity requirements specified by the UE, wherein a first data session of the plurality of data sessions is associated with a first gateway, and wherein a second data session of the plurality of data sessions is associated with a second gateway, and transmitting the request to establish the at least one DN session.

Certain aspects of the present disclosure provide a method for wireless communications by a network node. The method generally includes receiving a request to establish at least one data network (DN) session for providing connectivity between a user equipment (UE) and a DN, wherein the at least one DN session supports a plurality of data sessions for enabling communication between one or more local endpoints in the UE and one or more endpoints in the DN, wherein each data session of the plurality of data sessions supports one or more connectivity requirements specified by the UE, wherein a first data session of the plurality of data sessions is associated with a first gateway, and wherein a second data session of the plurality of data sessions is associated with a second gateway, and transmitting a confirmation to the UE indicating that the at least one DN session was established.

Certain aspects of the present disclosure provide an apparatus for wireless communications by a network node. The apparatus generally includes at least one processor configured to receive a request to establish at least one data network (DN) session for providing connectivity between a user equipment (UE) and a DN, wherein the at least one DN session supports a plurality of data sessions for enabling communication between one or more local endpoints in the UE and one or more endpoints in the DN, wherein each data session of the plurality of data sessions supports one or more connectivity requirements specified by the UE, wherein a first data session of the plurality of data sessions is associated with a first gateway, and wherein a second data session of the plurality of data sessions is associated with a second gateway, and a transmitter configured to transmit a confirmation to the UE indicating that the at least one DN session was established. The apparatus also generally includes a memory coupled with the at least one processor.

Certain aspects of the present disclosure provide an apparatus for wireless communications by a network node. The apparatus generally includes means for receiving a request to establish at least one data network (DN) session for providing connectivity between a user equipment (UE) and a DN, wherein the at least one DN session supports a plurality of data sessions for enabling communication between one or more local endpoints in the UE and one or more endpoints in the DN, wherein each data session of the plurality of data sessions supports one or more connectivity requirements ally, where there are operations illustrated in figures, those operations may have is associated with a first gateway, and wherein a second data session of the plurality of data sessions is associated with a second gateway, and means for transmitting a confirmation to the UE indicating that the at least one DN session was established.

Certain aspects of the present disclosure provide a non-transitory computer-readable medium for wireless communications by a network node. The non-transitory computer-readable medium generally includes instructions for receiving a request to establish at least one data network (DN) session for providing connectivity between a user equipment (UE) and a DN, wherein the at least one DN session supports a plurality of data sessions for enabling communication between one or more local endpoints in the UE and one or more endpoints in the DN, wherein each data session of the plurality of data sessions supports one or more connectivity requirements specified by the UE, wherein a first data session of the plurality of data sessions is associated with a first gateway, and wherein a second data session of the plurality of data sessions is associated with a second gateway, and transmitting a confirmation to the UE indicating that the at least one DN session was established.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
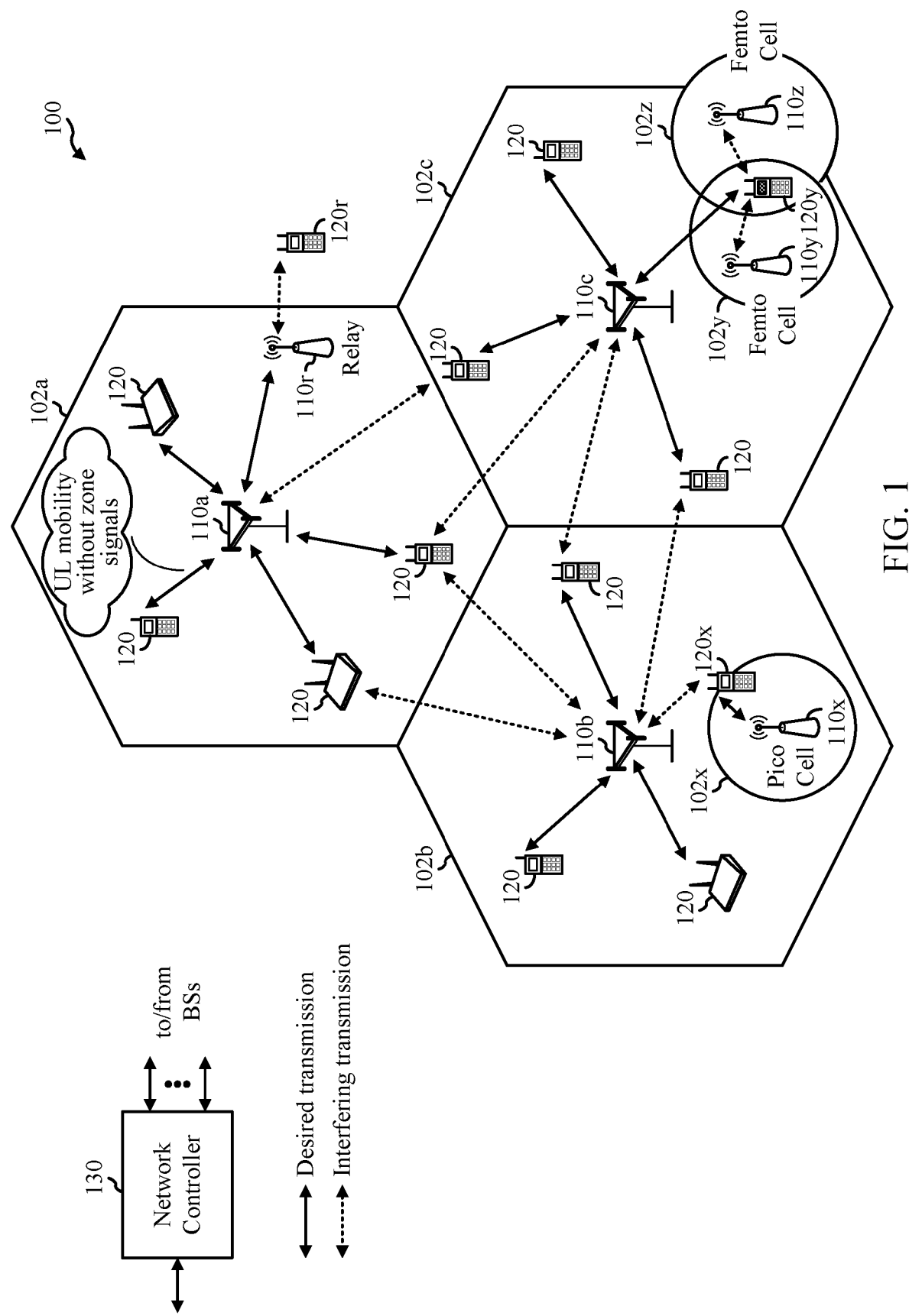
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

Aspects of the present disclosure relate to session management for data network (DN) sessions and network slicing in a 5G NextGen (next generation) network. More specifically, aspects of the present disclosure address a session management model for a 5G NextGen network, the correlation between session management and mobility management functionality, and how to enable operators to use the network slicing concept to efficiently support multiple 3rd parties (e.g. enterprises, service providers, content providers, etc.) that require similar network characteristics.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed, for example, for enabling connectivity sessions and internet protocol (IP) establishment, as described in greater detail below.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a subcarrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
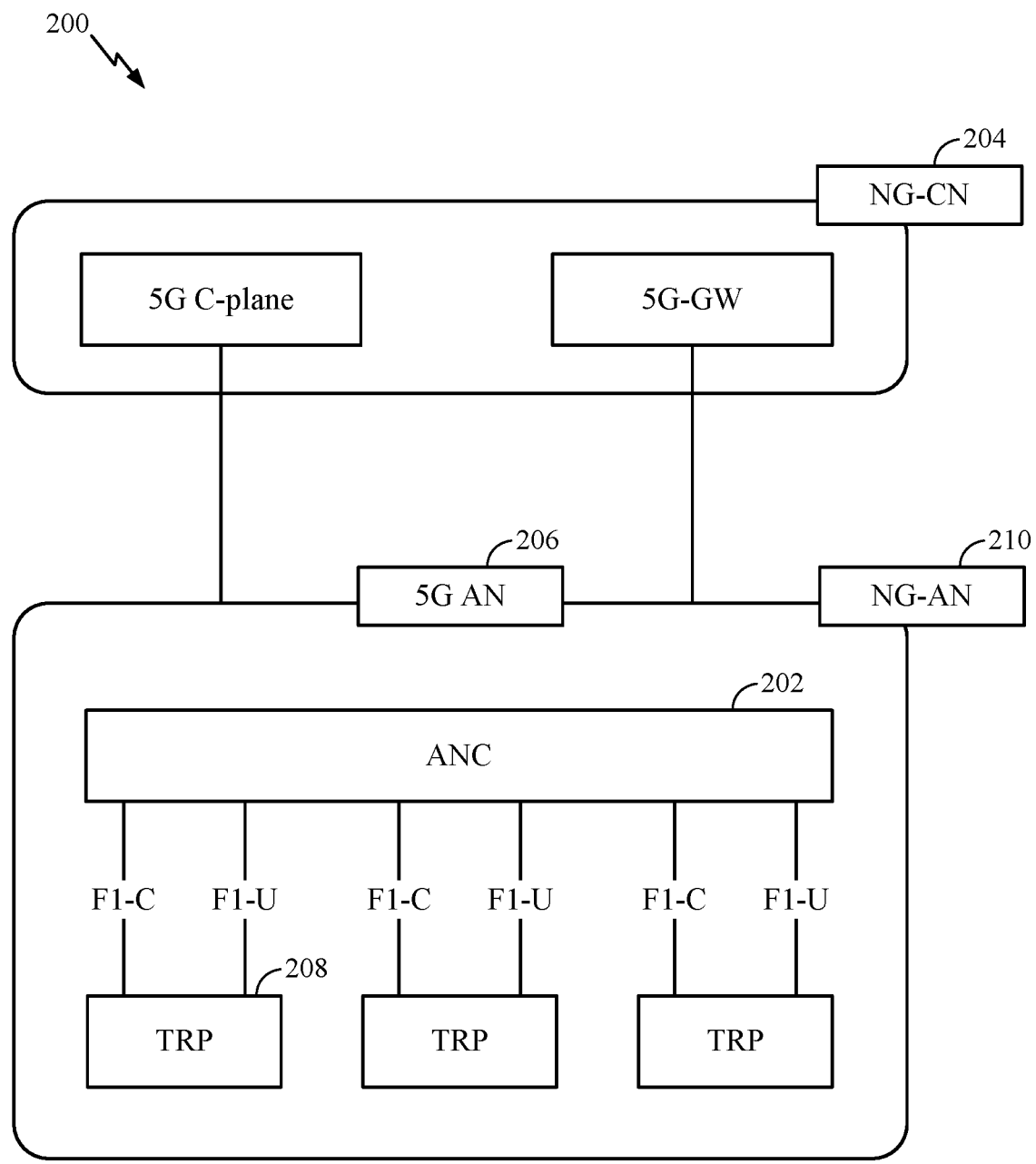
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
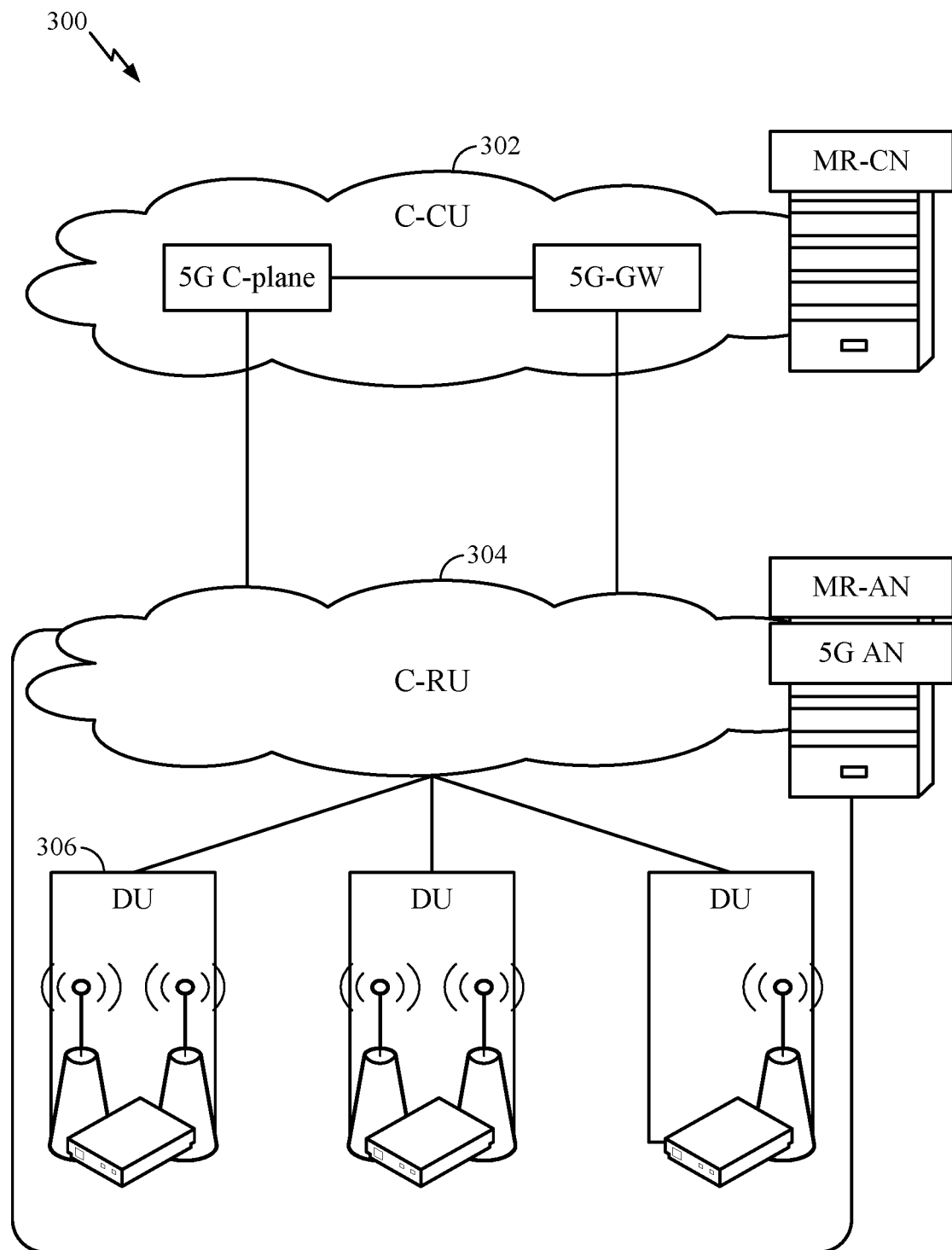
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
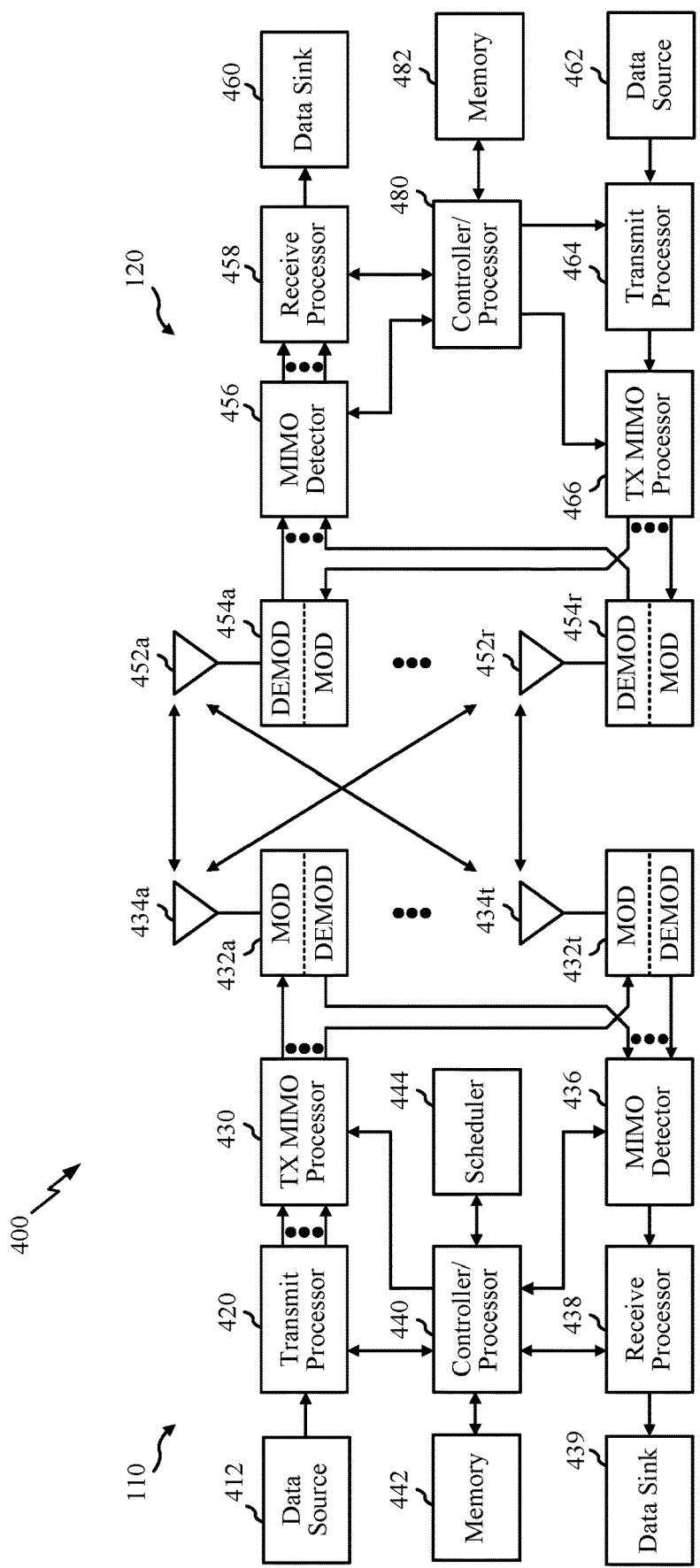
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 10-11.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 12, and/or other processes for the techniques described herein. The processor 480 and/or other processors and modules at the UE 120 may also perform or direct, e.g., the execution of the functional blocks illustrated in FIGS. 10 and 11, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
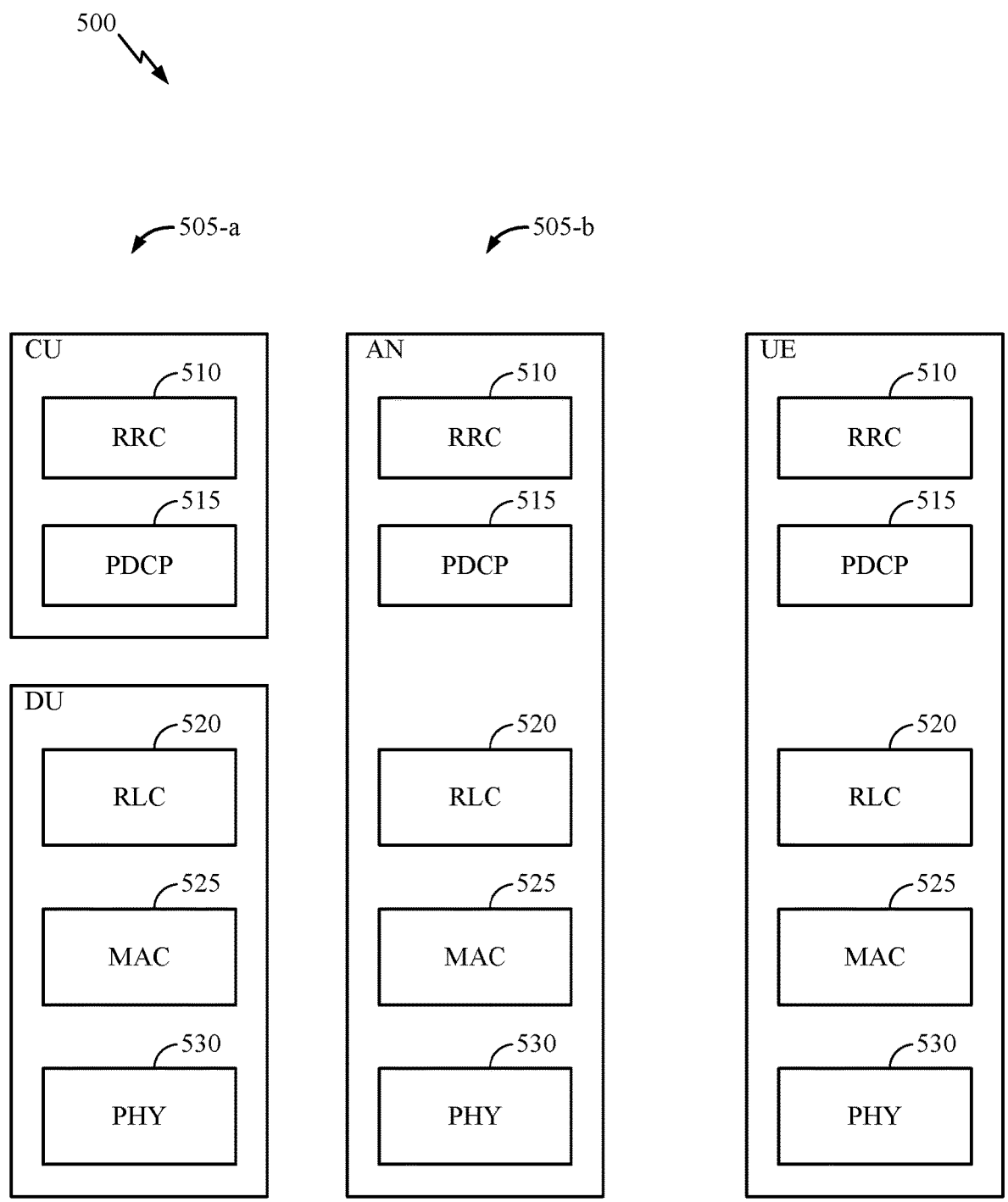
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
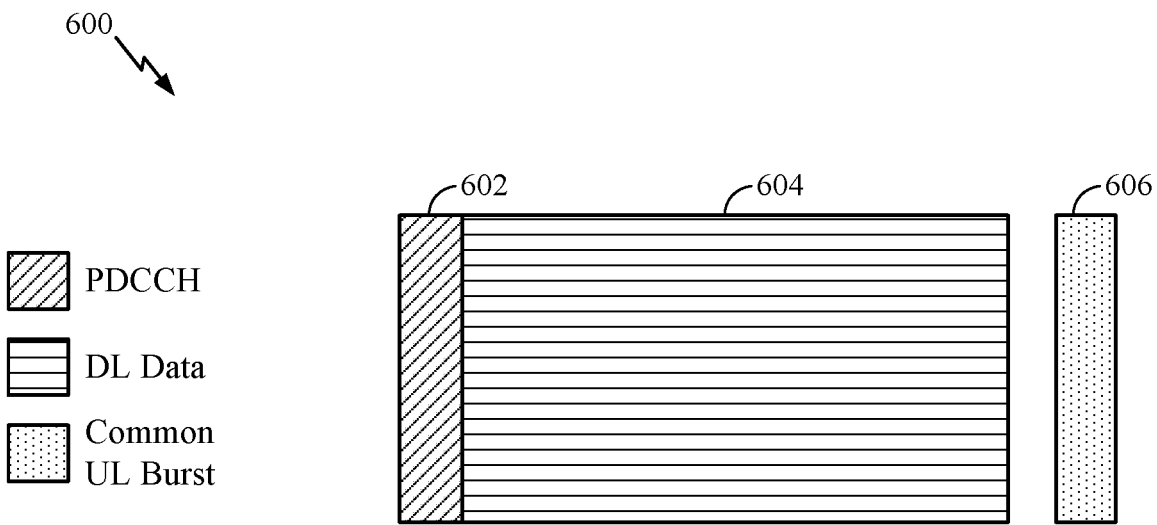
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
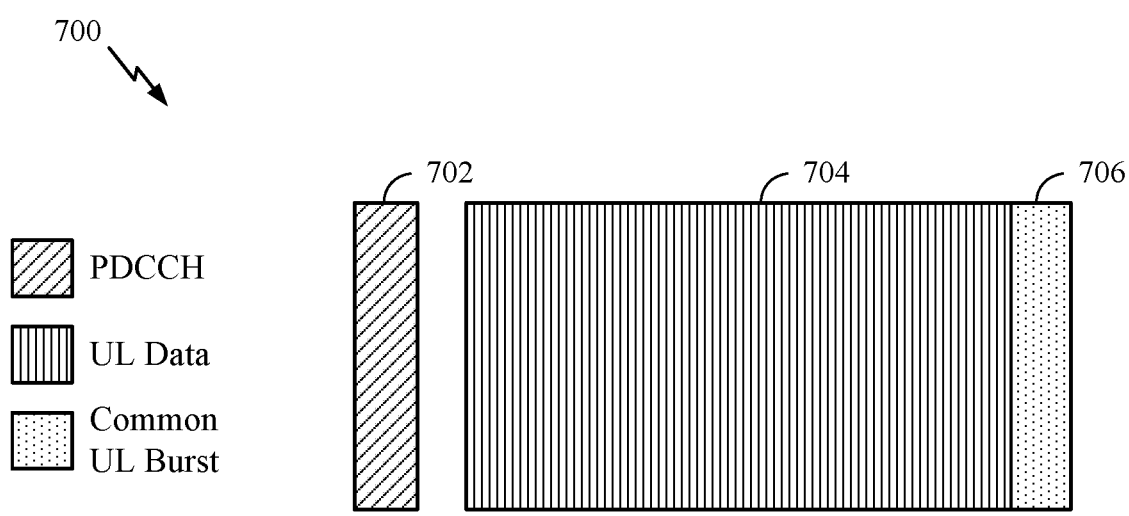
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Mechanism to Enable Connectivity
Session and IP Session Establishment

Aspects of the present disclosure relate to session management for data network (DN) sessions and network slicing in a 5G NextGen network, such as the 5G NextGen network illustrated in FIG. 1. More specifically, aspects of the present disclosure address a session management model for a 5G NextGen network and the correlation between session management and mobility management functionality. It should be noted that though the following description is made with reference to a 5G NextGen network, the techniques and principles described herein may also be applied to any other suitable network type, and are not so limited.

As noted, the 5G NextGen network introduces the concept of network slicing. For example, a network may have multiple slices, which may support different services, for example, internet of everything (IoE), URLLC, eMBB, vehicle-to-vehicle (V2V) communications, etc. A slice may be defined as a composition of adequately configured network functions, network applications, and underlying cloud infrastructures that are bundled together to meet the requirement of a specific use case or business model. In some cases, different slices may be assigned disjoint resources and may have different requirements, such as latency and/or power. In either case, each network slice may provide devices with connectivity with the network via one or more DN sessions.

According to certain aspects, in a 5G network, a DN session comprises a set of context information in various entities that provides connectivity between the UE and a data network (e.g. IMS, Internet, dedicated DNs, etc.). A DN session may support one or more sessions (e.g. data sessions (e.g., packet data unit (PDU) sessions)), that may be established in the DN session. A data session may comprise a logical context in a user equipment (UE) that enables communication between a local endpoint in the UE (e.g. a web browser) and another endpoint (e.g. a web server in a remote host, a data server in the access network or in the next generation network, etc.). A data session may be an IP session or a non-IP session (e.g. carrying Ethernet PDUs or unstructured data PDUs), depending on the type of data (e.g. PDUs) transported. In certain aspects, a given data session may only correspond to one type of data (e.g. IP, non-IP). According to certain aspects, a data session within a DN session may be established when an application in the UE triggers the establishment of a communication (e.g. for an IP data session a new network socket is created by an application) and is terminated either by the application, or the remote endpoint or the networking stack in the UE (in case of errors), and is bound to one or more of an IP address of the data session, a layer 2 networking address of the data session (e.g. a Media Access Control—MAC address), a transport protocol (e.g. UDP, TCP, Ethernet), and one or more port numbers.

Figure 8:
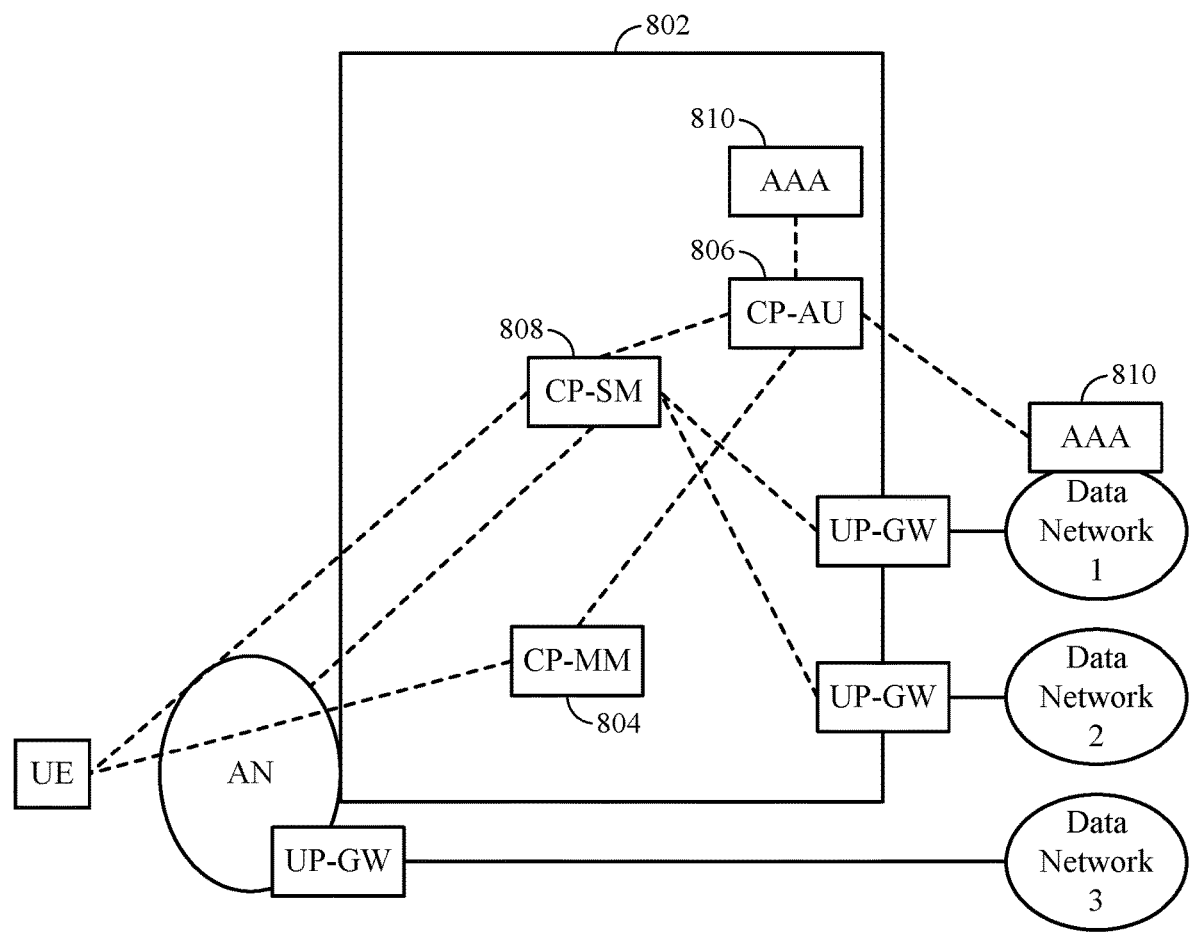
FIG. 8 illustrates an example session management architecture of a 5G NextGen network, in accordance with certain aspects of the present disclosure.

FIG. 8 illustrates an example session management architecture of a 5G NextGen network, in accordance with certain aspects of the present disclosure. As illustrated, the session management architecture shown in FIG. 8 includes a core network 802, which may include various components in charge of authenticating and maintaining sessions within the network. For example, as illustrated, the core network 802 may include a Control Plane Mobility Management (CP-MM) function 804, which is in charge of establishing and maintaining the mobility management (MM) context for a device (e.g., a UE) attaching to the 5G NextGen network, over one or multiple access technologies. According to certain aspects, the CP-MM 804 may solely be implemented in the NexGen core network 802 or the CP-MM functionality may be distributed between the access network (e.g. RAN) and the NexGen core network 802.

Additionally, one or multiple CP-MM instances may be applied when a device connects to multiple network instances/slices, which may depend on the definition for the architecture for network slices. According to certain aspects, the CP-MM 804 may interact with the Control Plane Authentication Management function (CP-AU) 806 to authenticate the device in order to establish a MM context for the device.

Additionally, the session management architecture shown in FIG. 8 includes a Control Plane Session Management (CP-SM) function 808, which is responsible for establishing, maintaining and terminating DN sessions and data sessions in the NextGen system architecture, including establishing sessions on demand. Additionally, the CP-SM 808 may optionally interact with the CP-AU 806 to authenticate the UE requests for session management (SM) context establishment, for example, in the case the credentials used by the UE for SM context establishment are different from the credentials used for MM context establishment.

Additionally, the session management architecture shown in FIG. 8 includes a profile repository and authentication server 810 (e.g., an authentication, authorization, and accounting (AAA) server), which stores a subscriber profile and a set of credentials corresponding to the subscriber. As illustrated, the profile repository and authentication server 810 may be located within the core network 802 or located locally in a Data Network (e.g., Data Network 1).

While not illustrated in FIG. 8, it may be assumed that a centralized storage may be shared by the various CP functions. This centralized storage may allow the CP functions to access context information stored by other CP functions, and may allow some CP functions (e.g., CP-MM, CP-SM, and CP-AU) to be stateless and retrieve a UE state only when they need to perform a specific task to handle the UE session management.

Figure 9:
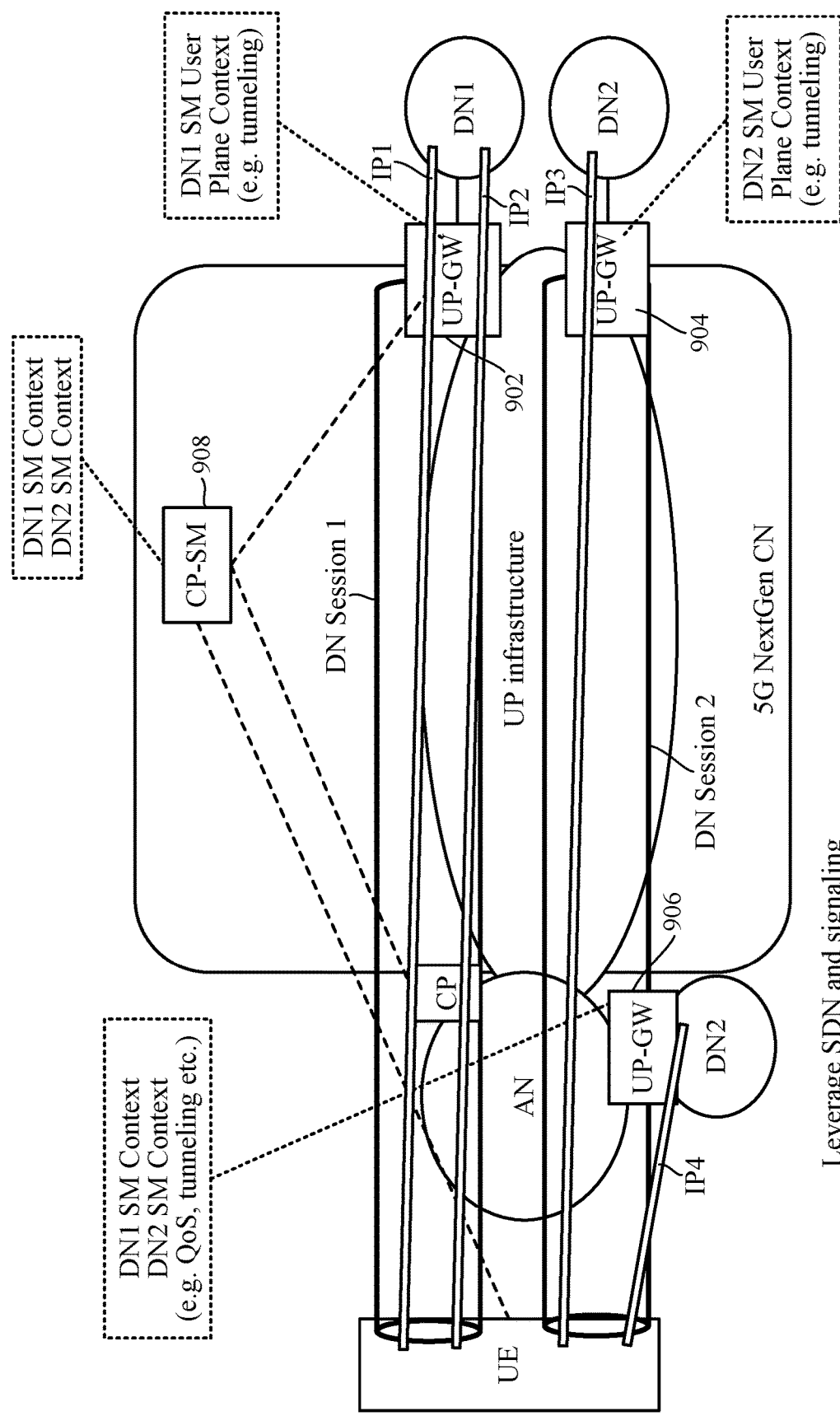
FIG. 9 illustrates an example network architecture of a 5G NextGen network, illustrating DN sessions, data sessions, and IP sessions, in accordance with certain aspects of the present disclosure.

FIG. 9 illustrates an example network architecture of a 5G NextGen network, illustrating DN sessions, data sessions, and IP sessions, in accordance with certain aspects of the present disclosure. For example, FIG. 9 illustrates two DN sessions (e.g., DN session 1 and DN session 2). As illustrated, DN session 1 is served by one user-plane gateway (UP-GW) 902 and contains two IP sessions corresponding to internet protocol (IP) address 1 (IP1) and IP address 2 (IP2). Since the two IP sessions utilize different IP addresses (IP1 and IP2) they may be within different data sessions. It should be noted that if the two IP sessions shared the same IP address (e.g., utilized different transport protocols, port numbers, etc.) they may be within a single data session. Additionally, as illustrated, DN session 2 also contains two IP sessions: one that is located in the core network and which assigns IP address 3 (IP3) and is associated with a UP-GW 904, and one located close to an access network and which assigns IP address 4 (IP4) and is associated with a UP-GW 906. Since the two IP sessions utilize different IP addresses (IP1 and IP2) they may be within different data sessions within DN session 2. According to certain aspects, the architecture illustrated in FIG. 9 may be different from the existing 4G EPC architecture (e.g., as illustrated in FIG. 1) in that, for example, one DN session (e.g., DN session 2) is served by two different gateways (e.g., UP-GWs 904 and 906) and has two IP sessions which are terminated in completely different locations within the network.

According to certain aspects, upon creation of a DN session the CP-SM 908 (which may comprise the CP-SM 808) may also be configured to select a UP-GW for future data sessions corresponding to the DN session and configure it to perform certain functions according to certain parameters without establishing a data session with the UP-GW. For example, the DN session may configure the UP-GW to handle certain forwarding functions for data packets based on port information, etc.

According to certain aspects, for each network slice, a UE may establish a single MM context with a CP-MM function. In some cases, a UE may establish an MM context with the network without requiring the establishment of any DN sessions, but a DN session can be established simultaneously with an MM context.

According to certain aspects, for each MM context, a UE can have multiple SM contexts (e.g., DN sessions). The establishment of any DN sessions in relation to an MM context may be authorized based on the previous establishment of an MM context.

According to certain aspects, the UE may be aware of the connectivity requirements for applications/services (e.g. what data network is required for an application/service, what the specific connectivity requirements are for transport, e.g. quality of service (QoS), etc.).

In EPC (e.g., in legacy 4G LTE), packet data network (PDN) connections are established when applications, associated with a certain PDN, request connectivity and the required PDN connection is not established yet. In the EPC, applications are bound to an Access Point Name (APN) that identifies a PDN connection, for example, based on local configuration in the device, but applications do not request connectivity to a specific APN. In contrast, according to certain aspects of the present disclosure, it is assumed that the UE is aware of the connectivity requirements for applications/services (e.g. what data network is required for an application/service, what the specific connectivity requirements are with respect to transport, e.g. the type of QoS, etc.). It is furthermore assumed that when applications require connectivity, they either provide specific connectivity requirements (e.g. QoS, type of connectivity in terms of local breakout, remote, etc.) or the UE is configured with information regarding connectivity requirements of specific applications.

According to certain aspects, when applications/services in the UE require connectivity, if the type of DN session required for the application/service is not established, the UE may trigger the establishment of the DN session. Additionally, when applications/services in the UE corresponding to a DN session require connectivity, if the existing data sessions do not satisfy the requirements for the application/service, the UE may trigger the establishment of a new data session that does satisfy the requirements for the application/service. According to certain aspects, data sessions in a DN session may be served by different UP-GWs, for example, as noted above with reference to FIG. 9. Further, different data sessions corresponding to a UE SM context for a DN session may be established over different access networks. Additionally, a UE may be served by different CP-SM functions for different DN sessions (e.g. if specialized features need to be implemented by CP-SM for specific services), with the CP-MM function coordinating the UE support via multiple CP-SMs.

According to certain aspects of the present disclosure, the establishment of a DN session may optionally be authenticated/authorized by the external DN via the session management functionality (e.g., via the CP-SM), which may include the ability for the external DN to provide service-specific profile information (e.g. QoS requirements, etc.) According to certain aspects, DN sessions authenticated/authorized by the external DN may be managed by a session management functionality deployed by the mobile network operator (MNO). Establishment and authorization of connectivity to various services in an operator network is maintained under the control of the MNO. The UE may have a single active operator subscription that's used with the operator network According to certain aspects, a UE may use different credentials for the establishment of the MM context and the establishment of each SM context. The UE may be provisioned with one or more set of credentials, for example, by the network. According to certain aspects, the credentials provisioned in the UE may be classified as either access credentials or connectivity credentials. Access credentials (e.g. credentials provided by a Mobile Network Operator, or a Mobile Virtual Network Operator, to a UE) enable the UE to establish an MM context with the network and, possibly, to establish one or more SM contexts with the core network. According to certain aspects, access credentials may be similar to current SIM or USIM credentials in the UE. According to certain aspects, in contrast to the EPC which may require multiple (U)SIM cards, UICCs, or eUICCs for a single UE, additional credentials can be provisioned to the UE by a 3rd party (e.g. service provider, content provider, etc.) for access to their specific services, and securely stored in the UE (e.g., in a secure storage).

Connectivity credentials, provisioned to the UE by an MNO, an MVNO, or by a 3rd party service provider, enable the UE to authenticate the establishment of a SM context while tying the SM context to a specific service and service provider (e.g. for authorization, connectivity profile, charging, policing, etc.). According to certain aspects, the entity providing credentials to the UE may configure the UE as to what credentials need to be used for the various services. For example, if the UE receives access credentials from an MNO, and the MNO also provides IMS services, the MNO may configure the UE to use the access credentials also for establishing connectivity to IMS.

Figure 10:
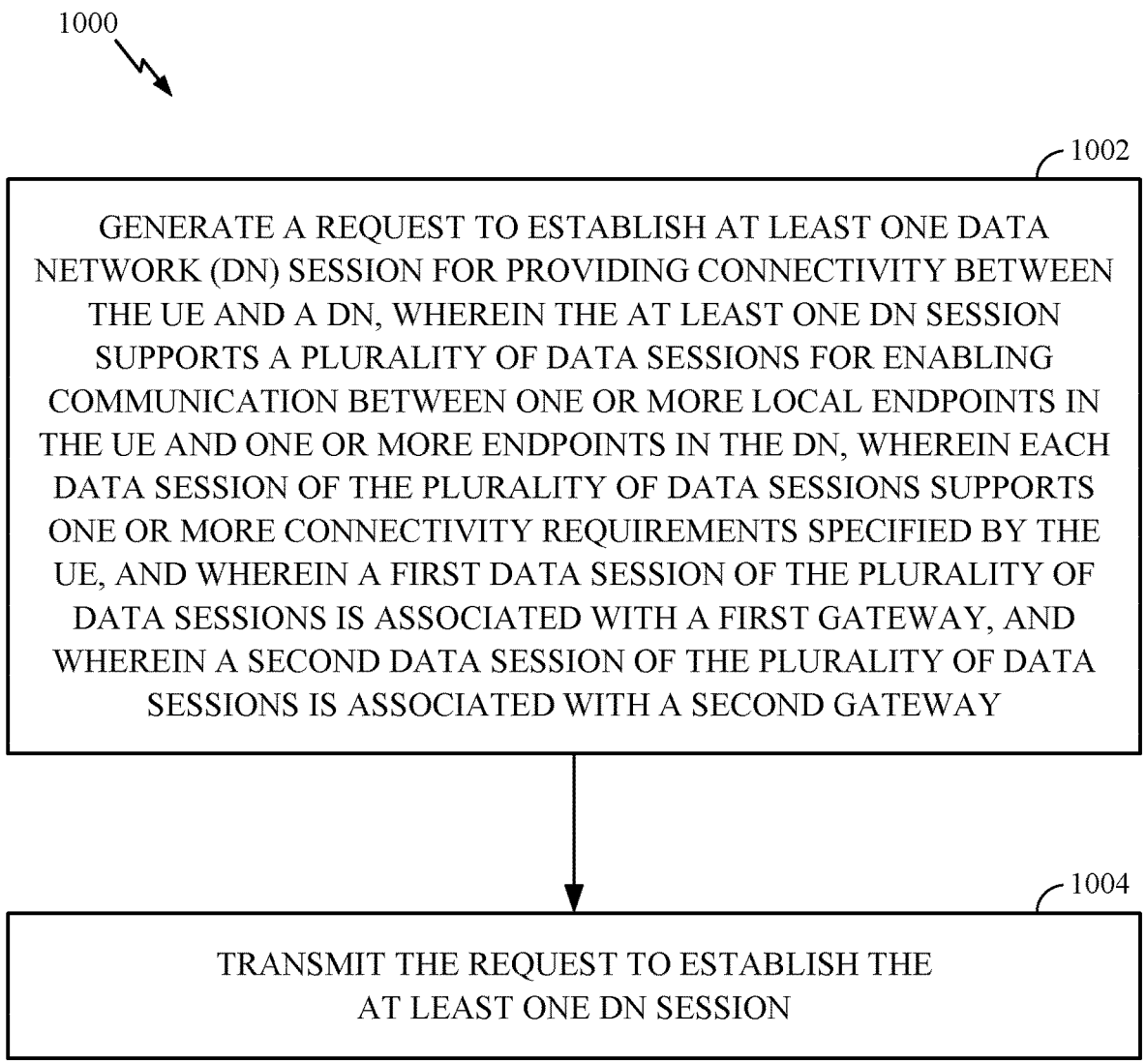
FIG. 10 illustrates example operations for wireless communications, for example, for establishing DN sessions and data sessions in a wireless network, in accordance with certain aspects of the present disclosure.

FIG. 10 illustrates example operations 1000 for wireless communications, for example, for establishing DN sessions and data sessions in a wireless network (e.g., a 5G NextGen network), which are described in greater detail below. According to certain aspects, operations 1000 may be performed by a user equipment (e.g., one or more of the UEs 120).

Operations 1000 begin at 1002 by generating a request to establish at least one data network (DN) session for providing connectivity between the UE and a DN, wherein the at least one DN session supports a plurality of data sessions for enabling communication between one or more local endpoints in the UE and one or more endpoints in the DN, wherein each data session of the plurality of data sessions supports one or more connectivity requirements specified by the UE, wherein a first data session of the plurality of data sessions is associated with a first gateway, and wherein a second data session of the plurality of data sessions is associated with a second gateway. At 1004, the UE transmits the request to establish the at least one DN session.

Figure 11:
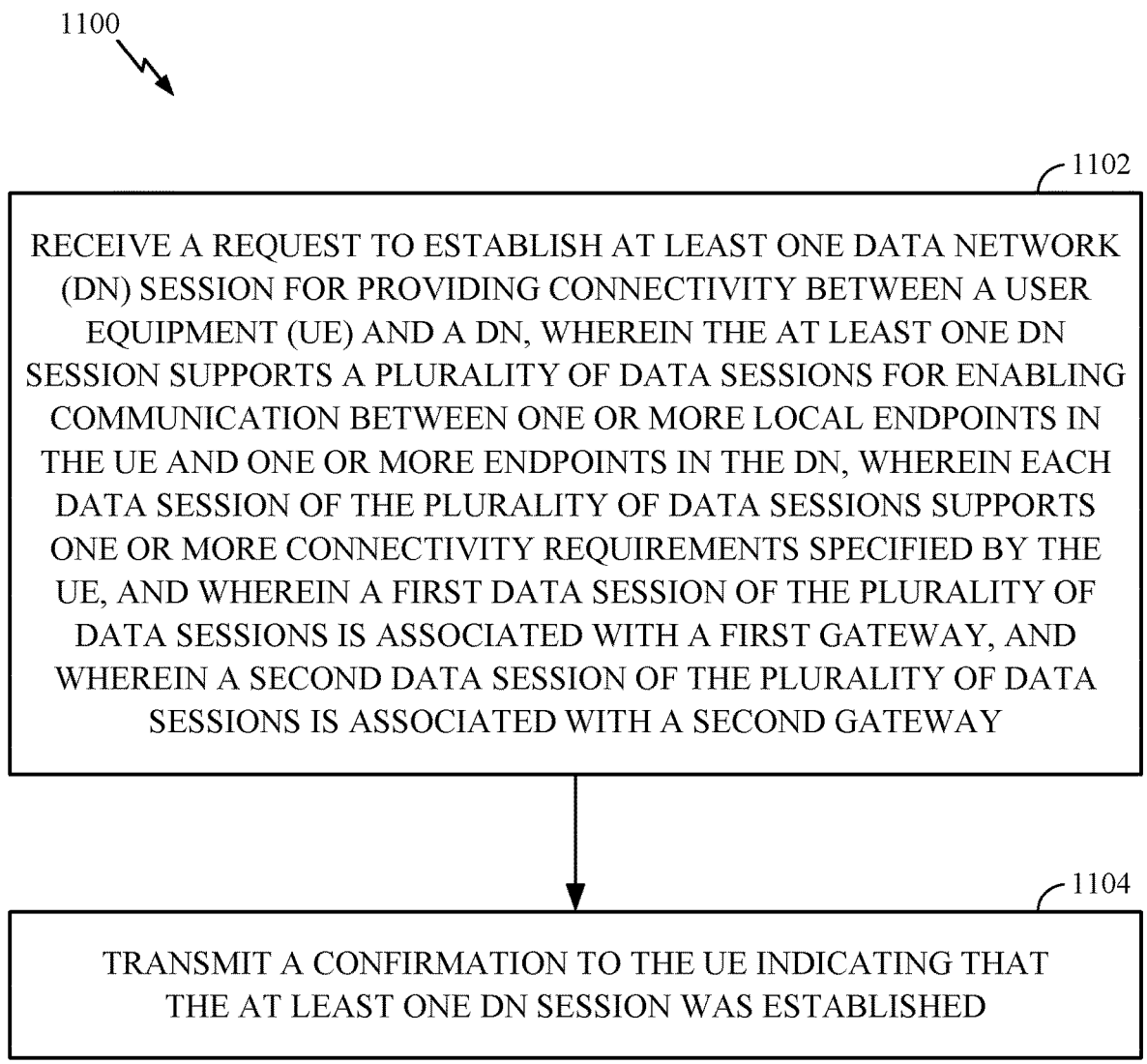
FIG. 11 illustrates example operations for wireless communications, for example, for establishing DN sessions and data sessions in a wireless network, in accordance with certain aspects of the present disclosure.

FIG. 11 illustrates example operations 1100 for wireless communications, for example, for establishing DN sessions and data sessions in a wireless network (e.g., a 5G NextGen network), which are described in greater detail below. According to certain aspects, operations 1100 may be performed by a network node (e.g., a CP-SM function 808 and/or 908).

Operations 1100 begin at 1102 by receiving a request to establish at least one data network (DN) session for providing connectivity between a user equipment (UE) and a DN, wherein the at least one DN session supports a plurality of data sessions for enabling communication between one or more local endpoints in the UE and one or more endpoints in the DN, wherein each data session of the plurality of data sessions supports one or more connectivity requirements specified by the UE, wherein a first data session of the plurality of data sessions is associated with a first gateway, and wherein a second data session of the plurality of data sessions is associated with a second gateway. At 1104, the network node transmits a confirmation to the UE indicating that the at least one DN session was established.

Establishment of a DN SM Context

According to certain aspects, a UE may establish DN SM contexts either automatically and simultaneously with the MM context establishment or on demand, for example, when applications/services in the UE require the establishment of connectivity using the access credentials. According to certain aspects, the establishment of a DN SM context may result in the establishment of a data session.

Figure 12:
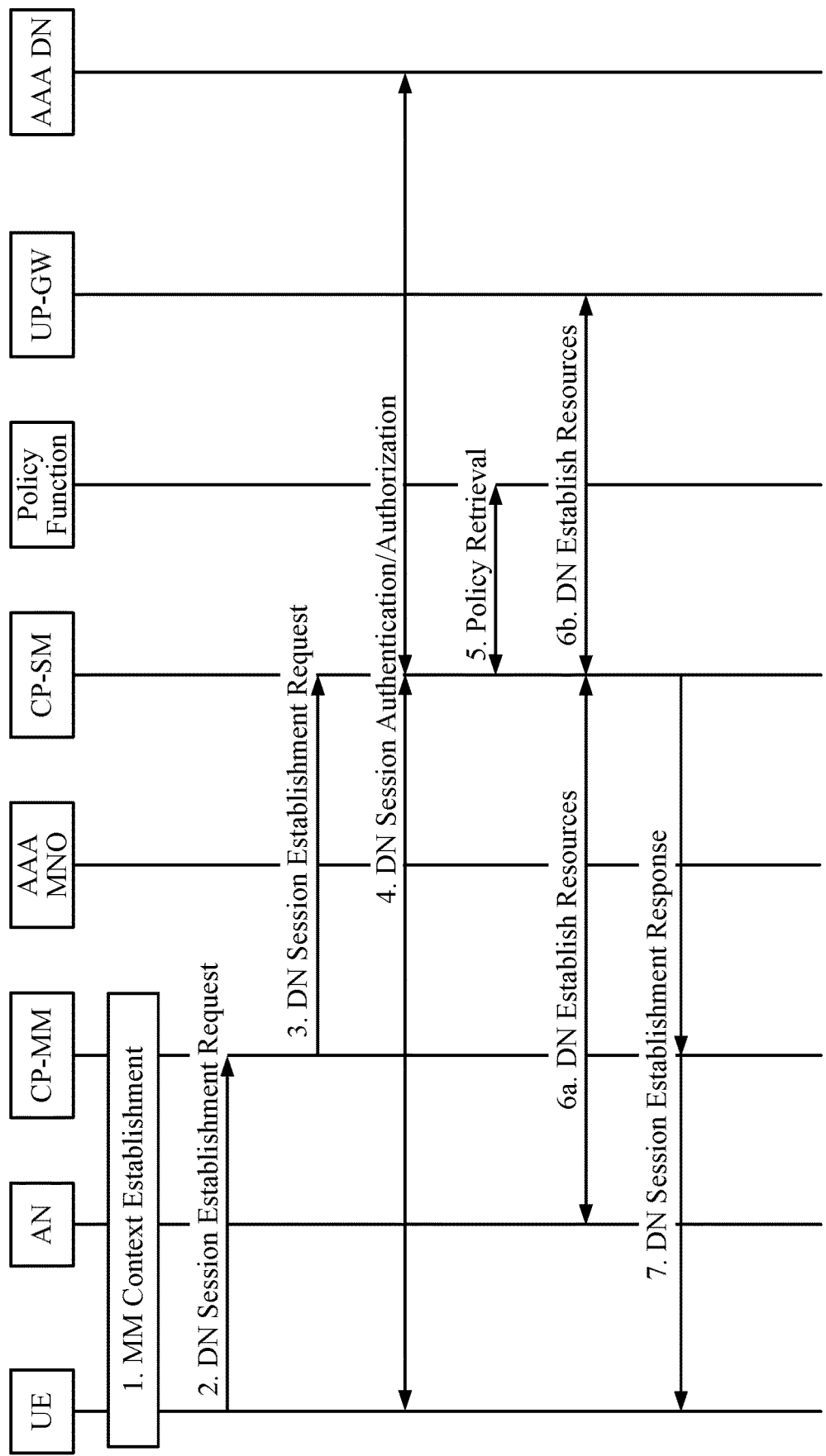
FIG. 12 illustrates a call flow diagram, showing an example process of establishing a DN session, in accordance with certain aspects of the present disclosure.

FIG. 12 illustrates a call flow diagram, showing an example process of establishing a DN session, in accordance with certain aspects of the present disclosure. The entities described in the following steps (e.g., CP-MM, CP-SM, AAA server, etc.) may correspond to one or more of the entities illustrated in the session management architecture of FIGS. 8 and/or 9.

At step (1), MM Context Establishment, the UE establishes a Mobility Management (MM) context via MM procedures with the CP-MM, including authentication using access credentials. According to certain aspects, the MM context establishment provides UE mobility tracking and a secure signaling channel over the access network (AN). The MM context establishment also retrieves the subscription profile corresponding to the access credentials.

At step (2), the UE sends a DN SM Establishment Request to the CP-MM in order to establish a DN session. According to certain aspects, the DN SM Establishment Request may include information describing the service and connectivity requirements (if any) for the DN session, including whether one or more data sessions need to be created and the requirements for each data session. More specifically, and according to certain aspects, the DN SM Establishment request may include information such as descriptors for the DN session requirements (e.g. connectivity requirements in terms of QoS requirements for the overall DN session, etc.). Additionally, if the DN session is to be authenticated/authorized using credentials that differ from those used to establish the MM context with the CP-MM, the UE may include the credentials (e.g., at least the UE identifier associated with the credentials) to be used to authenticate/authorize the creation within the DN SM Establishment Request. Additionally, the DN SM Establishment Request may include service requirements, including, for example, an identifier of the service type associated with the DN session request, or an identifier of one or more applications associated with the DN session request. The DN SM Establishment Request may also include an identifier of the DN. Further, the UE may also include the UE identity corresponding to the connectivity credentials, for example, as described above, to be used to authorize the DN SM Establishment. In some cases, the CP function can derive the data session requirements based on information on the service/application(s) and the UE profile.

In some cases, the UE may establish a DN session without establishing any data sessions. In this case, if the UE specifies connectivity requirements for the DN session, any data session that is established in that DN session later on will assume the same connectivity requirements. For example, if the UE specifies in the DN SM Establishment Request a specific QoS, any data sessions established within that DN session will assume that same QoS. If the UE does not specify connectivity requirements in the DN session request, the UE may specify connectivity requirements on a per-data session basis when establishing data sessions. In this case, each data session established in a DN session may operate under differently-specified connectivity requirements.

According to certain aspects, at step (3) illustrated in FIG. 12, the CP-MM receives the DN SM Establishment Request and verifies if the UE is authorized to establish a DN SM context, selects the CP-SM function to serve the UE (e.g. based on the information describing the service and the requirements for the DN session in the DN SM Establishment Request), and forwards the request to the selected CP-SM. In some cases, the UE may need to address the CP-MM for such signaling. Additionally, in some cases, the signaling is addressed to a front-end signaling function that, based on the information provided by the UE and previous context established in CP-MM and possibly stored in a common data storage, verifies if the UE is authorized to establish a DN SM context and selects the CP-SM function.

According to certain aspects, at step (4), the CP-SM verifies the UE request for the DN session based on the information provided by the UE with respect to the UE profile. The CP-SM optionally triggers the authentication of the DN SM Establishment Request based on the provided UE identity, interacting with the AAA server corresponding to the connectivity credentials, which may be operated by the data network (e.g., one of data networks DN1, DN2, or DN3 illustrated in FIG. 8). During the authentication procedure, the AAA server may provide a connectivity profile to the CP-SM containing service specific requirements (e.g. QoS, connectivity type, etc.). The CP-SM verifies the UE is authorized to establish one or more data sessions matching the connectivity requirements provided by the UE. In some cases, the establishment of a DN SM context related to the same credentials used for the MM context may require further authentication for the SM context establishment. Additionally, in some cases the security context established for the MM context can be reused for the SM context established with the access credentials. Additionally, according to certain aspects, various types of authentication may be supported. For example, authentication mechanisms based on the Extensible Authentication Protocol (EAP) may be supported, e.g., EAP-SIM, EAP-AKA, EAP-AKA', or EAP-TLS.

At step (5), the CP-SM interacts with the policing function to determine the policies to be applied to the DN session and to any requested data sessions.

At step (6), the CP-SM establishes the resources required to establish the DN session. According to certain aspects, for each data session that needs to be created, the CP-SM selects a UP-GW (e.g. based on the information describing the service, the requirements for the DN session, the connectivity profile, etc.). The CP-SM interacts with the UP-GW for the establishment of the DN session (e.g. IP address allocation for DN session for IP traffic). If no data sessions need to be created, the CP-SM does not select a UP-GW. Additionally, in step (6), the CP-SM interacts with the AN for the establishment of the DN session, providing information regarding the DN session that relates to the AN.

According to certain aspects, the resource establishment for a data session may include establishment of tunneling of packet data units (PDUs) corresponding to the data session between the AN and the corresponding UP-GW. According to certain aspects, routing of PDUs between the AN and a UP-GW and a corresponding need for tunneling may depend on mechanisms for session continuity, mobility management, transport of non-IP PDUs, and/or QoS.

At step (7), the CP-SM confirms to the UE the establishment of the DN SM context and includes information related to the DN SM context (e.g. IP address if one was allocated, etc.). For example, the confirmation may comprise an IP address of the UE for each data session that was established in the DN session. It should be noted that this is different as compared to the existing 4G LTE EPC architecture in which a UE may only receive one (possibly two) IP address(es) (e.g., only an IPv4 and/or IPv6 address) for the same PDN.

Additionally, the CP-SM may return an address of an UP-GW for each data session that was established, which may allow the UE to establish additional data sessions by directly requesting them from the UP-GW, as described in further detail below.

Establishment of Additional Data Session for a DN SM Context Via CP-SM

According to certain aspects, once a DN session and the corresponding DN SM context are established, if specific connectivity requirements arise in the UE for an application or service, the UE may establish additional data sessions within an existing DN session. For example, the UE sends the additional request in relation to an existing SM session, and provides connectivity requirements (e.g. regarding QoS, as an example when existing connectivity supports a specific level of QoS and the new applications requiring connectivity instead require a different level of QoS; regarding the type of connectivity the applications require, as an example when existing connectivity supports a data network in the core network, and the new applications requiring connectivity instead require connectivity to a data network local to the access network) in SM signaling to the CP-SM serving the DN SM context. According to certain aspects, establishing additional data sessions for an existing DN SM context may result in the CP-SM selecting additional UP-GWs and assigning additional IP addresses to the UE, as noted above.

Figure 13:
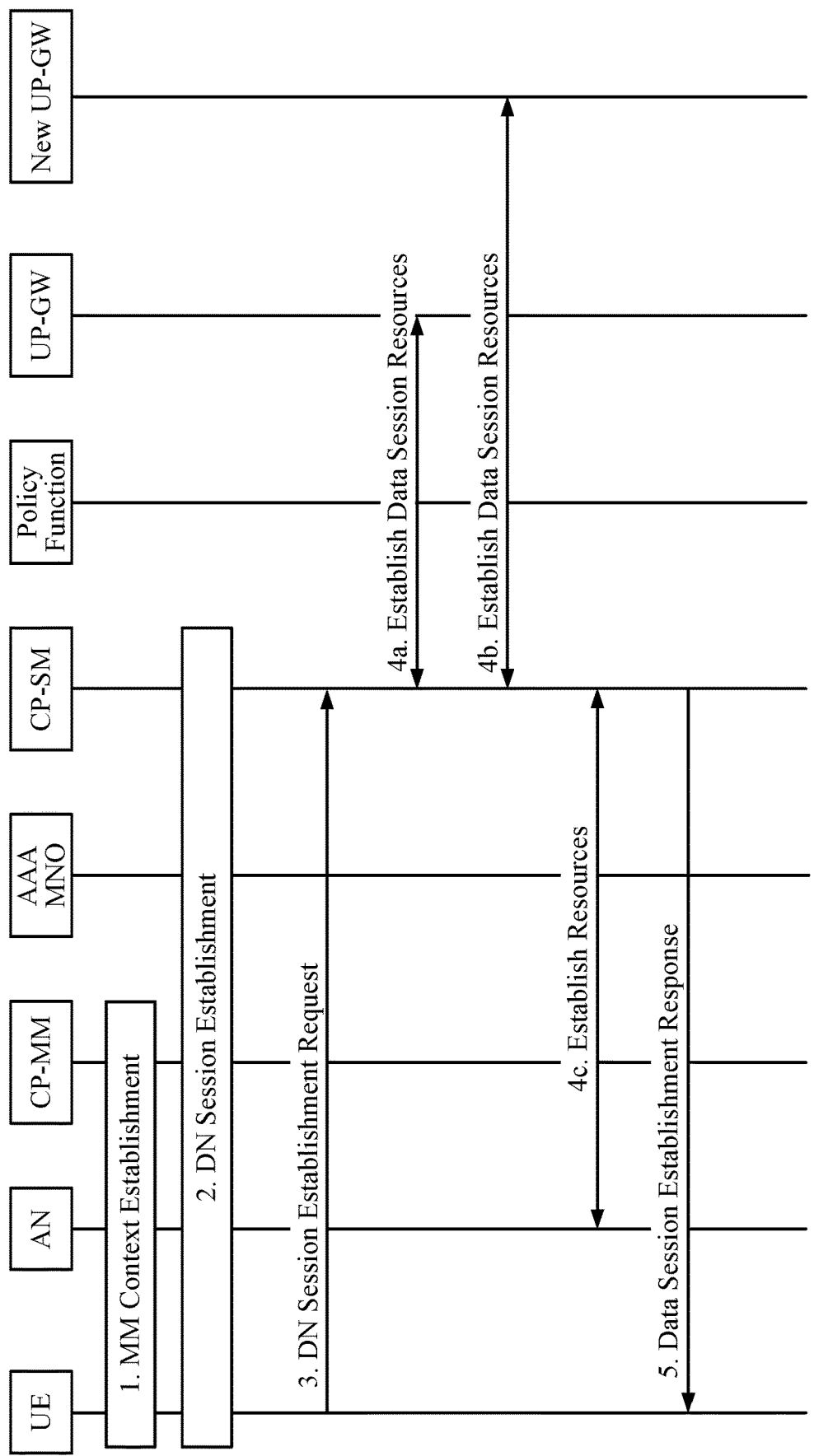
FIG. 13 illustrates a call flow diagram, showing an example process of establishing a data session, in accordance with certain aspects of the present disclosure.

FIG. 13 illustrates a call flow diagram, showing an example process of establishing a data session, in accordance with certain aspects of the present disclosure. The entities described in the following steps (e.g., CP-MM, CP-SM, AAA server, etc.) may correspond to one or more of the entities illustrated in the session management architecture of FIGS. 8 and/or 9.

Steps (1) and (2) of FIG. 13 assume that an MM context and a DN session has already been established, for example, by performing the steps illustrated in FIG. 12.

At step (3), the UE sends a Data Session Establishment Request to the CP-SM in order to establish a new data session, identifying the related DN SM context and providing connectivity requirements. In some cases, the UE may transmit this request to the CP-MM and the CP-MM may coordinate with the CP-SM to handle the request. Additionally, in some cases the UE may send the request directly to the CP-SM. According to certain aspects, the establishment of a Data Session could take place via protocols such as Dynamic Host Configuration Protocol (DHCP) extended to carry the needed information.

At step (4), the CP-SM verifies that the UE is authorized to establish additional data sessions for the existing DN SM context which match the connectivity requirements provided by the UE. If authorized, the CP-SM (e.g. based on the connectivity requirements, the UE subscription profile, etc.) may select a different UP-GW to serve the new data session. According to certain aspects, the UP-GW selected for the new data session may reside in a different network location as compared to another data session in the same DN session. For example, as illustrated in FIG. 9, data session with IP4 is associated with a UP-GW 906 located near the AN while the UP-GW 904 for data session with IP3 is located in the NextGen core network.

Additionally, in step (4) the CP-SM establishes the resources required to establish the DN session. According to certain aspects, if a new IP address is required from the current UP-GW, the CP-SM requests one from current UP-GW. Additionally, if a new UP-GW is required, the CP-SM selects the new UP-GW (e.g. based on the information describing the service, the requirements for the DN session, the connectivity profile, etc.) and interacts with the new UP-GW for the establishment of the DN Session (e.g. IP address allocation for DN Session for IP traffic). Additionally, the CP-SM interacts with the AN for the establishment of the Data Session. The resource establishment for a data session may include establishment of tunneling of PDUs corresponding to the data session between the AN and the corresponding UP-GW. As noted above, routing of PDUs between the AN and a UP-GW and a corresponding need for tunneling may depend on session continuity, mobility management, transport of non-IP PDUs, and QoS.

At step (5), the CP-SM transmits a confirmation to the UE indicating that the requested additional data session was established and includes information related to the data session (e.g. IP address). As noted above, the UE may be assigned a unique IP address for each established data session.

Establishment of Additional Data Session for a DN SM Context Via UP-GW

As noted above, an additional option for the establishment of a data session may be for the UE to transmit a Data Session Establishment Request directly to a UP-GW, which in turn verifies the request with the CP-SM. If the request is authorized, the CP-SM authorizes the UP-GW to create a new data session and, for IP data sessions, allocate a new IP address. If the request requires the allocation of a new UP-GW (e.g. in a different location, e.g. at the AN edge), the UE request may be pre-authorized by the CP-SM, which instructs the UE to resend the request to the correct UP-GW.

Figure 14:
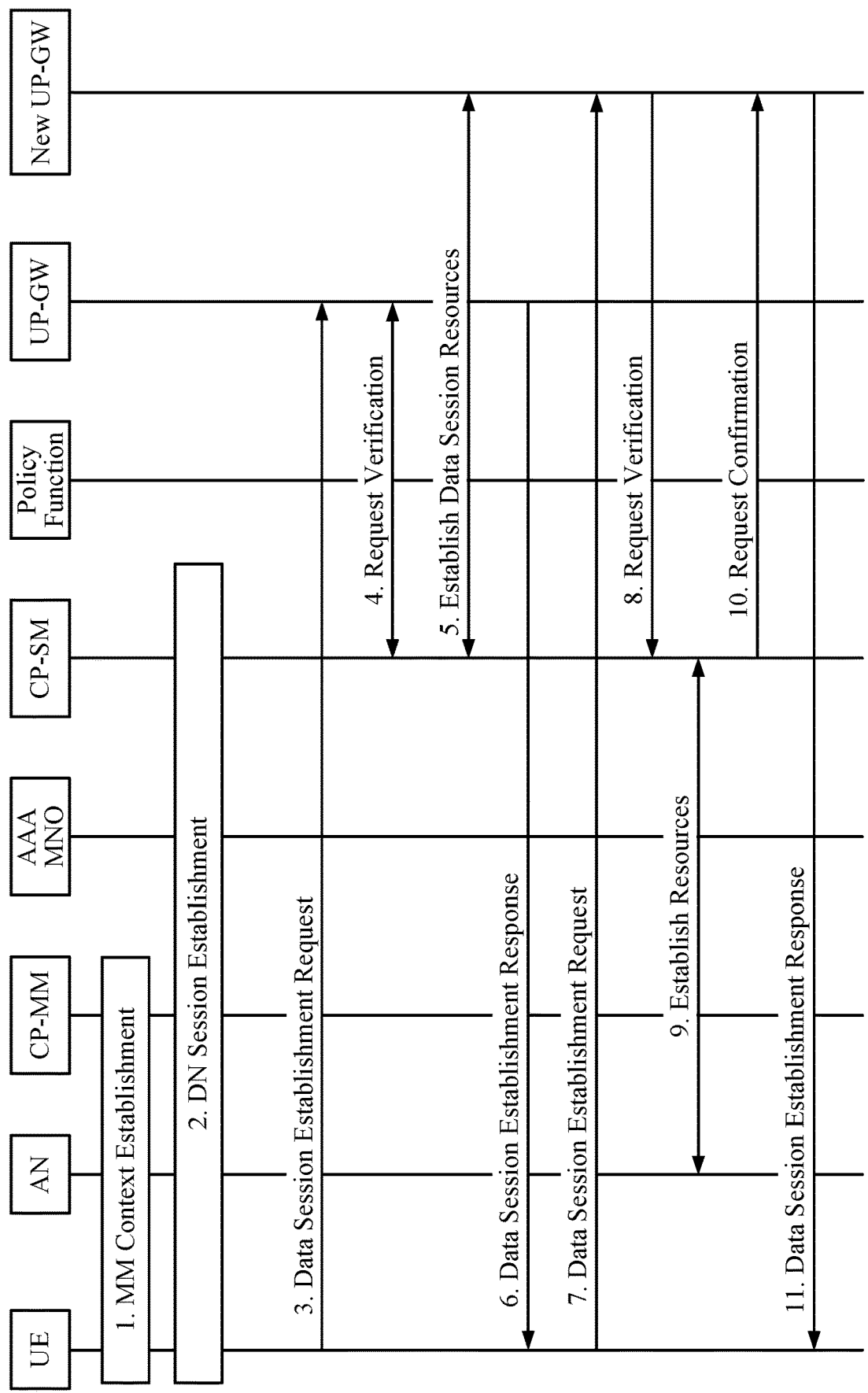
FIG. 14 illustrates a call flow diagram, showing an example process of establishing a data session directly with a UP-GW, in accordance with certain aspects of the present disclosure.

FIG. 14 illustrates a call flow diagram, showing an example process of establishing a data session directly with a UP-GW, in accordance with certain aspects of the present disclosure. The entities described in the following steps (e.g., CP-MM, CP-SM, AAA server, etc.) may correspond to one or more of the entities illustrated in the session management architecture of FIGS. 8 and/or 9.

Steps (1) and (2) of FIG. 14 assume that an MM context and a DN session has already been established, for example, by performing the steps illustrated in FIG. 12.

At step (3), in order to establish a new data session, the UE sends a Data Session Establishment Request to the UP-GW that the CP-SM has assigned to the UE in the DN session establishment stage, identifying the related DN SM context and providing connectivity requirements. As noted above, the establishment of a data session could take place via protocols such as DHCP extended to carry the needed information.

At step (4), the UP-GW processes the information provided by the UE and sends a verification request to the CP-SM including the information provided by the UE. The CP-SM verifies the UE is authorized to establish additional data sessions for the existing DN SM context and the connectivity requirements provided by the UE. If authorized, the CP-SM (e.g. based on the connectivity requirements, the UE subscription profile, etc.) may select a different UP-GW to serve the new data session. The CP-SM provides to the current UP-GW information to be provided to the UE (including the address of the new UP-GW).

At step (5), the CP-SM establishes the resources required to establish the DN session with the new UP-GW.

At step (6), the UP-GW sends a Data Session Establishment Response to the UE indicating that the UE needs to send a another Data Session Establishment Request to the new UP-GW. The Data Session Establishment Response may include the address of the new UP-GW.

At step (7), the UE sends a Data Session Establishment Request to the new UP-GW in order to establish a new data session, identifying the related DN SM context and providing connectivity requirements.

At step (8), the UP-GW processes the information provided by the UE and sends a verification request to the CP-SM including the information provided by the UE.

At step (9), if the request is authorized, the CP-SM interacts with the AN for the establishment of the data session associated with the new UP-GW. According to certain aspects, the resource establishment for the data session may include establishment of tunneling of PDUs corresponding to the data session between the AN and the corresponding new UP-GW. As noted, the routing of PDUs between the AN and a UP-GW and the corresponding need for tunneling may depend on session continuity, mobility management, transport of non-IP PDUs, and QoS.

At step (10) the CP-SM provides a confirmation to the new UP-GW, indicating that the UE is authorized to establish the requested data session.

At step (11) the CP-SM transmits a confirmation to the UE indicating that the requested data session with the new UP-GW was established and includes information related to the data session (e.g. IP address). As noted above, the UE may be assigned a unique IP address for each established data session.

It should be noted that the techniques described above differ from session management procedures in the EPC of 4G LTE. For example, a UE may be assigned multiple IP addresses and UP-GWs for a single data network connection. According to certain aspects, this overcomes the limitation of EPC in which, if the UE requires both home routed and local breakout (LBO) routing for IP flows corresponding to a given APN, the UE would have to setup multiple PDN connections to the same APN, and ensure one is home routed and one is LBO routed.

Additionally, with respect to authentication/authorization of DN sessions (e.g., step 4 of FIG. 12), in the EPC of 4G LTE, the UE may provide in the UE-requested PDN connectivity procedure (e.g., in the protocol configuration options field) the information for authentication/authorization of the request using Password Authentication Protocol (PAP)/Challenge Handshake Authentication Protocol (CHAP). This was previously introduced to enable the UE to obtain explicit authorization by the entity or service provider operating the specific PDN to which the UE is requesting connectivity.

At present, the EPC supports only a basic authentication/authorization based on username and password, and does not enable more common authentication mechanism that service and content providers have in place for authentication of access to their services and content. Moreover, at present the authorization/authentication of such PDN connections by the EPC is performed via an exchange between the PDN-GW and the external PDN/service provider, which requires the EPC to first select a PDN-GW before the connection is authorized by the external service/content provider. Depending on the type of service/connectivity that the external data network supports, in NextGen the core network may be allowed to select a UP-GW in an optimal location depending on the specific service, and such selection would benefit from an interaction between the NextGen network and the external DN or service provider.

In addition, in the EPC, policing of connectivity with a DN that is authorized/authenticated via PAP/CHAP is based solely on the UE subscription related to the operator credentials and subscriptions that the UE is using when authenticating with the MME, and possibly preconfigured information in the PDN-GW to support such external network. However, no dynamic policing based on the external DN or service provider is possible in the EPC, which restricts the applicability of the mechanism, for example, to third party service or content providers that may want to provide different policing (e.g. QoS requirements) for different subscribers that can have access to their DN.

Further, according to certain aspects, in addition to considering network slicing, techniques presented herein also proposes the concept of service slicing in order to enable efficient and flexible provisioning of connectivity to service providers (e.g., enterprises, service providers, content providers, third party entities, etc.) that require similar network characteristics. Service slicing enables a UE, provisioned with multiple credentials (each corresponding to a specific service, service provider or 3rd party entity) to establish SM contexts and connectivity for each service separately and on-demand.

Additionally, according to certain aspects, the techniques presented herein enable a model in which the MNO interacts with third party to provide connectivity that satisfies the service requirement of the 3rd parties (e.g. content providers) in a flexible way. This is flexible in the sense that is not tied to preconfiguration of information (e.g., in a PDN-GW of the EPC of 4G LTE), but is based on dynamic "profile" and "requirements" that the third party can provide to the MNO during the authentication/authorization of the connectivity establishment.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for detecting, means for determining, means for using (e.g., a data session), means for verifying, means for selecting, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 10-11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
   generating a request to establish at least one data network (DN) session for providing connectivity between the UE and a DN, wherein the at least one DN session supports a plurality of data sessions for enabling communication between one or more local endpoints in the UE and one or more endpoints in the DN, wherein each data session of the plurality of data sessions supports one or more connectivity requirements specified by the UE, wherein the at least one DN session is served by at least two packet data network (PDN) gateways, wherein a first data session of the plurality of data sessions is associated with a first PDN gateway of the at least two PDN gateways, and wherein a second data session of the plurality of data sessions is associated with a second PDN gateway of the at least two PDN gateways, wherein:
   the request comprises an indication of a plurality of data sessions to be established in the at least one DN session;
   the request comprises at least one connectivity requirement for each data session of the plurality of data sessions to be established; and
   the at least one connectivity requirement comprises at least a quality of service required for each data session of the plurality of data sessions to be established;
   transmitting the request to establish the at least one DN session; and
   receiving a confirmation that the at least one DN session was established, wherein the confirmation comprises:
   a different internet protocol (IP) address of the UE for each data session of the plurality of data sessions that was established; and
   an address of one of the at least two PDN gateways for each data session of the plurality of data sessions that was established.

2. The method of claim 1, wherein the request comprises at least one connectivity requirement for the DN session, and wherein each data session of the plurality of data sessions supports the at least one connectivity requirement.

3. The method of claim 1, wherein the first PDN gateway and the second PDN gateway reside in or at different network entities.

4. The method of claim 1, wherein generating the request to establish the at least one DN session comprises:
   detecting at least one local endpoint at the UE requires connectivity to the DN; and
   determining, based on the detection, if a DN session is already established with the DN.

5. The method of claim 4, further comprising:
   generating the request to establish the at least one DN session when a DN session is not already established; or
   when a DN session is already established, determining whether the established DN session comprises a data session that supports connectivity requirements for the at least one local endpoint in the UE requiring connectivity to the DN.

6. The method of claim 5, further comprising:
   when it is determined that the established DN session comprises a data session that supports the connectivity requirements for the at least one local endpoint in the UE requiring connectivity to the DN, using that data session to enable communication between that local endpoint and the DN; or
   when it is determined that the established DN session does not comprise a data session that supports the connectivity requirements for the at least one local endpoint in the UE requiring connectivity to the DN, generating a second request to establish a new data session in the DN session for that local endpoint, based on the connectivity requirements for that local endpoint.

7. The method of claim 1, wherein the request further comprises UE credentials to be used to authenticate the request to establish at least one DN session.

8. The method of claim 1, further comprising transmitting, to the first PDN gateway, an additional request for establishing a new data session, wherein establishing the new data session comprises establishing the new data session directly with the first PDN gateway.

9. The method of claim 1, wherein:
   the first PDN gateway is located within an access network and the second PDN gateway is located within a core network.

10. A method for wireless communication by a network node, comprising:
receiving a request to establish at least one data network (DN) session for providing connectivity between a user equipment (UE) and a DN, wherein the at least one DN session supports a plurality of data sessions for enabling communication between one or more local endpoints in the UE and one or more endpoints in the DN, wherein each data session of the plurality of data sessions supports one or more connectivity requirements specified by the UE, wherein the at least one DN session is served by at least two packet data network (PDN) gateways, wherein a first data session of the plurality of data sessions is associated with a first PDN gateway of the at least two PDN gateways, and wherein a second data session of the plurality of data sessions is associated with a second PDN gateway of the at least two PDN gateways, wherein:
the request comprises an indication of a plurality of data sessions to be established in the at least one DN session;
the request comprises at least one connectivity requirement for each data session of the plurality of data sessions to be established; and
the at least one connectivity requirement comprises at least a quality of service required for each data session of the plurality of data sessions to be established; and
transmitting a confirmation to the UE indicating that the at least one DN session was established, wherein the confirmation comprises:
a different internet protocol (IP) address of the UE for each data session of the plurality of data sessions that was established; and
an address of one of the at least two PDN gateways for each data session of the plurality of data sessions that was established.

11. The method of claim 10, wherein the request comprises at least one connectivity requirement for the DN session, and wherein each data session of the plurality of data sessions supports the at least one connectivity requirement.

12. The method of claim 10, further comprising verifying the UE is authorized to establish the data sessions matching the at least one connectivity requirement.

13. The method of claim 10, further comprising:
selecting the first PDN gateway and the second PDN gateway based, at least in part, on the at least one connectivity requirement for each data session.

14. The method of claim 10, further comprising:
determining one or more policies to be applied to the at least one DN session and to each of the data sessions; and
applying the one or more policies to the at least one DN session and each of the data sessions.

15. The method of claim 10, wherein the first PDN gateway and the second PDN gateway reside in or at different network entities.

16. The method of claim 10, further comprising:
when the at least one established DN session comprises a data session that supports connectivity requirements for at least one local endpoint at the UE requiring connectivity to the DN, using that data session to enable communication between the at least one local endpoint and the DN; or
when the at least one established DN session does not comprise a data session that supports the connectivity requirements for the at least one local endpoint in the UE requiring connectivity to the DN, receiving a second request to establish a new data session in the DN session for the at least one local endpoint, based on the connectivity requirements for the at least one local endpoint.

17. An apparatus for wireless communication by a user equipment (UE), comprising:
at least one processor configured to:
generate a request to establish at least one data network (DN) session for providing connectivity between the UE and a DN, wherein the at least one DN session supports a plurality of data sessions for enabling communication between one or more local endpoints in the UE and one or more endpoints in the DN, wherein each data session of the plurality of data sessions supports one or more connectivity requirements specified by the UE, wherein the at least one DN session is served by at least two packet data network (PDN) gateways, wherein a first data session of the plurality of data sessions is associated with a first PDN gateway of the at least two PDN gateways, and wherein a second data session of the plurality of data sessions is associated with a second PDN gateway of the at least two PDN gateways, wherein:
the request comprises an indication of a plurality of data sessions to be established in the at least one DN session;
the request comprises at least one connectivity requirement for each data session of the plurality of data sessions to be established; and
the at least one connectivity requirement comprises at least a quality of service required for each data session of the plurality of data sessions to be established;
a transmitter configured to transmit the request to establish the at least one DN session; and
a receiver configured to receive a confirmation that the at least one DN session was established, wherein the confirmation comprises:
a different internet protocol (IP) address of the UE for each data session of the plurality of data sessions that was established; and
an address of one of the at least two PDN gateways for each data session of the plurality of data sessions that was established.

18. The apparatus of claim 17, wherein the first PDN gateway and the second PDN gateway reside in or at different network entities.

19. The apparatus of claim 17, wherein the at least one processor is configured to generate the request to establish the at least one DN session by:
detecting at least one local endpoint at the UE requires connectivity to the DN; and
determining, based on the detection, if a DN session is already established with the DN.

20. The apparatus of claim 19, wherein the at least one processor is configured to:
generate the request to establish the at least one DN session when a DN session is not already established; or
when a DN session is already established, determine whether the established DN session comprises a data session that supports connectivity requirements for the at least one local endpoint in the UE requiring connectivity to the DN.

21. The apparatus of claim 20, wherein the at least one processor is configured to:
when it is determined that the established DN session comprises a data session that supports the connectivity requirements for the at least one local endpoint in the UE requiring connectivity to the DN, use that data session to enable communication between that local endpoint and the DN; or
when it is determined that the established DN session does not comprise a data session that supports the connectivity requirements for the at least one local endpoint in the UE requiring connectivity to the DN, generate a second request to establish a new data session in the DN session for that local endpoint, based on the connectivity requirements for that local endpoint.

22. An apparatus for wireless communication by a network node, comprising:
at least one processor configured to:
receive a request to establish at least one data network (DN) session for providing connectivity between a user equipment (UE) and a DN, wherein the at least one DN session supports a plurality of data sessions for enabling communication between one or more local endpoints in the UE and one or more endpoints in the DN, wherein each data session of the plurality of data sessions supports one or more connectivity requirements specified by the UE, wherein the at least one DN session is served by at least two packet data network (PDN) gateways, wherein a first data session of the plurality of data sessions is associated with a first PDN gateway of the at least two PDN gateways, and wherein a second data session of the plurality of data sessions is associated with a second PDN gateway of the at least two PDN gateways, wherein:
the request comprises an indication of a plurality of data sessions to be established in the at least one DN session;
the request comprises at least one connectivity requirement for each data session of the plurality of data sessions to be established; and
the at least one connectivity requirement comprises at least a quality of service required for each data session of the plurality of data sessions to be established;

a transmitter configured to transmit a confirmation to the UE indicating that the at least one DN session was established, wherein the confirmation further comprises:
a different internet protocol (IP) address of the UE for each data session of the plurality of data sessions that was established; and
an address of one of the at least two PDN gateways for each data session of the plurality of data sessions that was established.

23. The apparatus of claim 22, wherein the at least one processor is further configured to verify the UE is authorized to establish the data sessions matching the at least one connectivity requirement.

24. The apparatus of claim 22, wherein the at least one processor is further configured to:
select the first PDN gateway and the second PDN gateway based, at least in part, on the at least one connectivity requirement for each data session.

25. The apparatus of claim 22, wherein the at least one processor is further configured to:
determine one or more policies to be applied to the at least one DN session and to each of the data sessions; and
apply the one or more policies to the at least one DN session and each of the data sessions.

26. The apparatus of claim 22, wherein the first PDN gateway and the second PDN gateway reside in or at different network entities.

27. The apparatus of claim 22, wherein the at least one processor is further configured to:
when the at least one established DN session comprises a data session that supports connectivity requirements for at least one local endpoint at the UE requiring connectivity to the DN, use that data session to enable communication between the at least one local endpoint and the DN; or
when the at least one established DN session does not comprise a data session that supports the connectivity requirements for the at least one local endpoint in the UE requiring connectivity to the DN, receive a second request to establish a new data session in the DN session for the at least one local endpoint, based on the connectivity requirements for the at least one local endpoint.

* * * * *